(12) United States Patent
Riel

(10) Patent No.: US 6,930,311 B1
(45) Date of Patent: Aug. 16, 2005

(54) LIGHTWEIGHT NEUTRON REMMETER

(75) Inventor: Gordon K. Riel, Edgewater, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 34 days.

(21) Appl. No.: 10/442,075

(22) Filed: May 21, 2003

(51) Int. Cl.⁷ .................................................. G01T 3/00

(52) U.S. Cl. .................................................. 250/390.01

(58) Field of Search ........................ 250/390.01, 269.4, 250/269.5, 265, 267

(56) References Cited

U.S. PATENT DOCUMENTS

| | | |
|---|---|---|
| 3,932,758 A | 1/1976 | Burgkhardt et al. |
| 4,100,414 A | 7/1978 | Distenfeld |
| 4,383,179 A | 5/1983 | Eisen et al. |
| 4,588,898 A * | 5/1986 | Piesch et al. ........... 250/390.03 |
| 5,578,830 A | 11/1996 | Olsher et al. |
| RE35,908 E | 9/1998 | Kitaguchi et al. |
| 6,362,485 B1 * | 3/2002 | Joyce et al. ........... 250/390.01 |

OTHER PUBLICATIONS

I.O. Andersson and J. Braun, A Neutron Rem Counter, Apr. 23, 1964, pp. 237-241.
J.C. Liu, S. Rokni, V. Vylet, R. Arora, Neutron Detection Time Dist. SLAC PUB 7353, Nov.
Robert L. Morris, Rapid Measurement of Neutron Dose Rate For Transport Index Feb. 27, 2000.

* cited by examiner

Primary Examiner—David Porta
Assistant Examiner—Marcus Taningco
(74) Attorney, Agent, or Firm—Steve W. Crabb

(57) ABSTRACT

A lightweight neutron remmeter for measuring neutron equivalent dose with a response range from the thermal energy levels to around 14 MeV is achieved using a center $BF_3$ proportional neutron detector moderated by enclosure within a cylindrical center tube and two adjacent $BF_3$ proportional neutron detectors. A cylindrical hydrogenous material covered by a boron loaded rubber wrap moderates the center detector within the center tube. The adjacent neutron detectors are uncovered. In this manner the center detector responds to fast neutrons and the over response to thermal and intermediate energy neutrons is corrected by the adjacent neutron detectors readings and an algorithm implemented by a RADIAC.

17 Claims, 1 Drawing Sheet

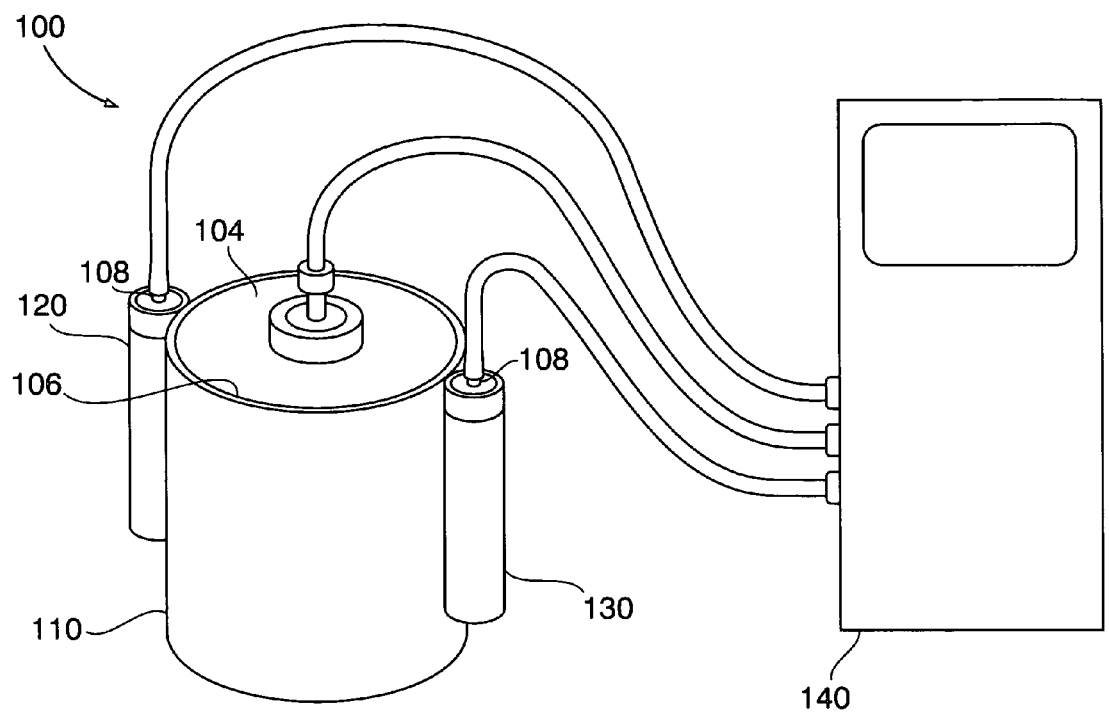
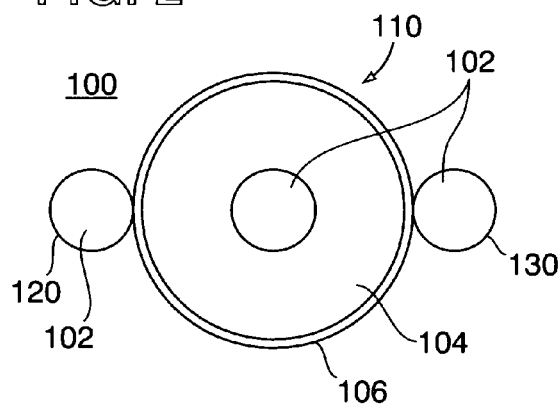
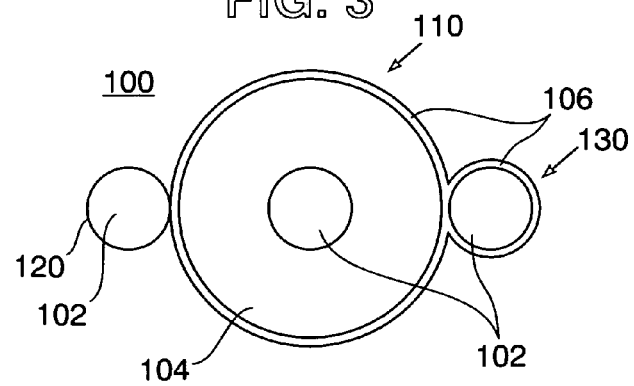

LIGHTWEIGHT NEUTRON REMMETER

STATEMENT OF GOVERNMENT INTEREST

The invention described herein may be manufactured and used by or for the Government of the United States of America for governmental purposes without payment of any royalties thereon or therefore.

BACKGROUND OF THE INVENTION

Dose equivalent in rem is used to quantify a measure of radiation damage for radiation protection purposes and is typically measured by a detector with a neutron sensitivity that is proportional to the dose equivalent in rem, or Sieverts independently of the energy or direction of the radiation field. This neutron detector commonly referred to as a remmeter responds to radiation similarly to how the human body would respond. Some devices, such as scintillators and proportional counters, produce a signal with an energy that varies with the neutron energy. The difficulty with detecting neutrons is that thermal, or low energy, neutrons are easy to detect but carry little dose equivalent, and that fast, or high energy, neutrons are hard to detect, but carry a large dose equivalent.

Generally, fast neutrons are detected by moderating a thermal neutron detector so that the detectors response is proportional to the dose equivalent in rem. Hydrogenous materials are the most common moderators used. The weight of the remmeter depends on the maximum energy that is to be measured and is largely due to the amount of moderating material required. A requirement that at least a 50 percent response be achieved at a maximum energy of 14 MeV requires a moderator weighing approximately 20 pounds. Additionally, heavily moderated thermal neutron detectors over respond at intermediate neutron energies (1 to 500 keV), so the efficiency is reduced by absorbing those neutrons that reach thermal energy after crossing only part of the moderator.

The Navy presently uses a remmeter called the AN/PDR-70, which has a right cylinder of hydrogenous moderator surrounding a proportional counter tube. Though its response varies more with direction than a remmeter with a spherical design its efficiency is higher because a cylinder can hold a larger detector. This device has good response but weighs almost 21 pounds and is too heavy for personnel to use for long periods of time.

What is needed is a lightweight remmeter that provides good response across a useful neutron energy range that is more easily portable by personnel.

SUMMARY OF THE INVENTION

In accordance with the invention there is provided a new and improved lightweight neutron remmeter having a center proportional $BF_3$ neutron counter that is moderated by a hydrogenous material and is covered with boron wrapping. The neutron remmeter further has at least one proportional $BF_3$ neutron counter adjacent the wrapped center neutron counter.

In a preferred arrangement, the detector has two adjacent proportional $BF_3$ neutron counters on opposite sides of the center neutron counter tube. In this arrangement one of the adjacent counter tubes may be partially wrapped in boron and the second adjacent tube is left uncovered.

In accordance with a preferred arrangement of the lightweight neutron remmeter invention, the neutron counters send signals to a multi-function RADIAC for an output that is based on a calculation that corrects for the thermal neutron over response of the center neutron counter tube. Optionally, this arrangement may be controlled by another microprocessor based measurement and display device including a microcomputer.

For a better understanding of the present invention, together with other and further objects thereof, reference is made to the following description, taken in conjunction with the accompanying drawings, and its scope will be pointed out in the appended claims.

BRIEF DESCRIPTION OF THE DRAWINGS

FIG. 1 is a perspective view of an example of a detector illustrating the approximate positions of the central tube and the two side tubes 180 degrees apart in accordance with the present invention.

FIG. 2 is a cross sectional view of another example of the neutron remmeter in accordance with the present invention in which the two outer tubes are uncovered.

FIG. 3 is a cross sectional view of an example of a neutron remmeter in accordance with another embodiment of the present invention in which one of the two outer tubes has a partial covering and the other tube is uncovered.

DESCRIPTION OF THE PREFERRED EMBODIMENT

Referring now to the example of FIG. 1, a detection system in accordance with the present invention that may be used by personnel to measure fluence. The basic detector 100 has a center tube 110, a first outer tube 120, and a second outer tube 130. These tubes are connected via connectors 108 and wires to a multi function RADIAC 140 for calculation of the dose equivalent in rem. The center tube 110, the first outer tube 120 and the second outer tube 130 may be kept in the proper positions with respect to each other by their cylindrical configuration as shown in FIG. 1 and use of any suitable mechanical means such as straps, glue or other fasteners.

In the example of FIG. 2, each of the outer tubes 120 and 130 is a commercially available $BF_3$ proportional neutron counter having the aluminum detector tube 102 therein. The first outer tube 120 and second outer tube 130 is a $BF_3$ proportional neutron counter with the aluminum detector tube 102 therein. In other embodiments of the invention it is possible to have additional outer tubes (not shown) that are spaced equally around the center tube for totals of three, four or more outer tubes. The center tube 110 uses a moderated $BF_3$ proportional neutron counter as the aluminum detector tube 102. Polyethylene 104 or other suitable hydrogenous material moderates the center $BF_3$ detector tube. Approximately one inch of polyethylene 104 was used in the example of the present invention illustrated in FIG. 2. Additionally, the center tube 110 is wrapped in a boron-loaded rubber covering 106. The covering 106 is boron powder in silicon rubber. The material used in the example covering was made with 61 grams of elemental boron (90% amorph) and 160 ML, RTV-615A silicon rubber compound and 16ML, RTV-615B curing agent.

Alternatively, other materials such as plastic may be used that are loaded with boron or another element with a high capture cross section for neutrons. Suitable elements may be chosen from the group helium, lithium, boron, cadmium, and gadolinium. By moderating a thermal neutron detector such as the $BF_3$ neutron counter 102, the detector will be sensitive to neutrons of much higher energies that enter the moderator and are slowed to the thermal range. Alternatively, other thermal neutron detectors such as helium isotope of mass 3 counter tubes and various solid-state detectors may be utilized.

The present invention has a neutron response range from thermal energies up to around 14 MeV. The detector 100 supplies signals of the neutron counts to the multi function RADIAC 140 available from SAIC, Thermo Eberline and other manufacturers.

The RADIAC computes the response based on the equation, $$R = A_0 B + A_1 T,$$

where R is the field strength in rem, B is the count rate of the detector tube 102 within the center tube 110 and T is the sum of the count rate of the outer counter tubes 120, 130, and others that may be used.

$A_0$ and $A_1$ are calculated using mathematical regression techniques from several readings taken in known fields, $R_i$, and the recorded $B_i$ and $T_i$ in each ith field. These constants are then programmed into the RADIAC.

The user may then calibrate the device for a particular field of interest by placing the device in a known field R and then computing a calibration constant, A3, by the equation, $$A_3 = R/(A_0 B + A_1 T).$$

The device may then be used in unknown fields and an output is displayed on the RADIAC in the form of R in rem calculated by the equation, $$R_u = A_3(A_0 B + A_1 T),$$

where $R_u$ is the unknown field.

The polyethylene core 104 has a passage to accept the $BF_3$ proportional neutron counter tube in its aluminum housing 102. The $BF_3$ counter 102 is level with the top of the cylindrical moderator 104 and exposed areas except the connector are covered with boron-loaded rubber to avoid a response to thermal neutrons by the center tube 110 that were not moderated fast neutrons. The bottom of the $BF_3$ counter 102 is covered by polyethylene 104 and boron loaded rubber in a similar manner as the sides.

In the example of FIG. 3, the basic system configuration is the same. However, in this embodiment the second outer tube 130 is partially wrapped with boron loaded rubber covering or other suitable covering as discussed with respect to FIG. 2. The center tube 110 uses a moderated $BF_3$ proportional neutron counter in an aluminum tube 102. Polyethylene 104 or other suitable hydrogenous material moderates the center $BF_3$ proportional counter tube 102. Approximately one inch of polyethylene was used in the example of the present invention illustrated in FIG. 3. The center tube 110 and the second outer tube 130 are in contact with each other and are wrapped in a boron-loaded rubber covering 106 that extends around the tubes as shown in FIG. 3. The center tube 110 and the second outer tube 130 are placed in contact with one another without boron-loaded rubber between. The central thermal neutron detector 102 has some fast neutron response because of the moderation of the one-inch of polyethylene cylinder 104. This central detector 102 will over respond to thermal and intermediate energy neutrons, however this over response is corrected by the first outer tube 120 detector 102 and the partially wrapped second outer tube 130 detector 102 and the RADIAC calculations.

The partially wrapped second outer tube 130 will respond to some fast neutrons that have been moderated by the polyethylene cylinder 104 and escape through the gap in the covering 106 between the center tube 110 and second outer tube 130. The boron rubber wrapping 106 in this example serves to shield the center tube 110 detector 102 from thermal neutrons and also shields the first outer tube 120 from neutrons scattered in the moderator 104. Thus, the first outer tube 120 will only respond to thermal neutrons and the second outer tube 130 will respond to thermal neutrons as well as some intermediate energy neutrons that are scattered from the center moderator 104.

The RADIAC computes the response based on the equation, $$R = A_0 B + A_1 T + A_2 M,$$

where the term "$A_2 M$" is added to the expression of [21] because the response of the second outer tube 130 will be different from the response of outer tube 120.

While there have been described what are believed to be the preferred embodiments of the present invention, those skilled in the art will recognize that other and further changes and modifications may be made thereto without departing from the spirit of the invention, and it is intended to claim all such changes and modifications that fall within the true scope of the invention.

What is claimed is:

1. A lightweight neutron-detector comprising:
   a center tube with a cylindrical covering thereon that is loaded with an element chosen from the group lithium, boron and cadmium;
   said center tube holding a moderating cylinder therein surrounding a neutron counter tube;
   and a first outer neutron counter tube positioned on the covering adjacent to said center tube.

2. A lightweight neutron detector as in claim 1, further comprising:
   a second outer neutron counter tube adjacent said center tube and opposite said first outer tube.

3. A lightweight neutron detector as in claim 2, wherein said moderating cylinder is polyethylene.

4. A lightweight neutron detector as in claim 3, wherein said covering is boron loaded rubber.

5. A lightweight neutron detector as in claim 3, wherein said covering is boron loaded plastic.

6. A lightweight neutron detector comprising:
   a neutron counter tube;
   a cylinder of polyethylene in coaxial surrounding relation to said neutron counter tube;
   a first outer neutron counter tube adjacent said cylinder of polyethylene;
   a second outer neutron counter tube adjacent said cylinder of polyethylene and opposite said first outer tube; and
   a covering completely wrapped around said cylinder of polyethylene and said first outer neutron counter tube.

7. A lightweight neutron detector as in claim 6, wherein said covering is boron loaded rubber.

8. A lightweight neutron detector as in claim 6, wherein said covering is boron loaded plastic.

9. A lightweight neutron remmeter comprising:
   an inner neutron counter tube;
   a cylinder of polyethylene surrounding and coaxial with said inner neutron counter tube;
   a cylindrical center container having a boron covering surrounding said cylinder of polyethylene and said inner neutron counter tube in coaxial relation thereto;

a first outer neutron counter tube adjacent said center container;

a second outer neutron counter tube adjacent said center container diametrically opposite said first outer tube; and calculator means connected to the inner and outer neutron counter tubes for interpreting signals therefrom and outputting a result.

10. A lightweight neutron remmeter as in claim 9, wherein said boron covering is boron loaded rubber.

11. A lightweight neutron remmeter as in claim 9, wherein said boron covering is boron loaded plastic.

12. A lightweight neutron remmeter as in claim 9, wherein said means for interpreting signals is a RADIAC.

13. A lightweight neutron remmeter comprising:

an inner neutron counter tube;

a cylinder of polyethylene surrounding and coaxial with said inner neutron counter tube;

a first outer neutron counter tube adjacent said cylinder of polyethylene;

a second outer neutron counter tube adjacent said cylinder of polyethylene diametrically opposite said first outer tube;

a covering completely wrapped around said cylinder of polyethylene and said first outer neutron counter tube; and handheld computer means operatively connected to said neutron counter tubes for display of reading therefrom.

14. A lightweight neutron detector as in claim 13, wherein said covering is boron loaded rubber.

15. A lightweight neutron detector as in claim 13, wherein said covering is boron loaded plastic.

16. An apparatus for evaluation of dose equivalent in a neutron radiation field, comprising: a moderator cylinder having an outer cylindrical surface; inner neutron detector means centrally disposed within said moderator cylinder for measurement of thermal neutrons therein; cover means completely wrapped about the outer cylindrical surface of the moderator cylinder for shielding thereof; at least two outer neutron detectors positioned on the cover means; and calculator means connected to the inner neutron detector means and the outer neutron detectors for displaying said evaluation of the dose equivalent in response to the measurements from the inner detector means and the outer detectors.

17. The apparatus as defined in claim 16, wherein said cover means extends from the outer cylindrical surface of the moderator cylinder about one of the outer neutron detectors.

* * * * *